US010057797B2

(12) United States Patent
Chakraborty et al.

(10) Patent No.: US 10,057,797 B2
(45) Date of Patent: Aug. 21, 2018

(54) TIME OFFSET ACQUISITION FOR DUAL CONNECTIVITY

(71) Applicant: AVAGO TECHNOLOGIES GENERAL IP (SINGAPORE) PTE. LTD., Singapore (SG)

(72) Inventors: Soumen Chakraborty, Sarjapura (IN); Sindhu Verma, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 179 days.

(21) Appl. No.: 14/610,707

(22) Filed: Jan. 30, 2015

(65) Prior Publication Data
US 2015/0223089 A1 Aug. 6, 2015

(30) Foreign Application Priority Data
Jan. 31, 2014 (IN) ..................................... 435/2014

(51) Int. Cl.
*H04W 24/08* (2009.01)
*H04W 56/00* (2009.01)
(Continued)

(52) U.S. Cl.
CPC ......... *H04W 24/08* (2013.01); *H04W 56/001* (2013.01); *H04W 56/0015* (2013.01);
(Continued)

(58) Field of Classification Search
CPC ........... H04W 52/0232; H04W 76/048; H04W 48/12; H04W 24/08; H04W 84/10; H04W 84/042; H04W 88/06
(Continued)

(56) References Cited

U.S. PATENT DOCUMENTS 8,611,913 B2 12/2013 Turtinen et al.
2009/0131075 A1* 5/2009 Mazlum ................ G01S 5/0205
455/456.1
(Continued)

FOREIGN PATENT DOCUMENTS

CN 102144423 8/2011
CN 102761951 10/2012
(Continued)

OTHER PUBLICATIONS

3rd Generation Partnership Project, LTE; Evolved Universal Terrestrial Radio Access (E-UTRA); Radio Resource Control (RRC); Protocol Specification, V9.6.0 (Release 9), Mar. 2011, 255 pages.
(Continued)

*Primary Examiner* — Jae Y Lee
*Assistant Examiner* — Jean F Voltaire
(74) *Attorney, Agent, or Firm* — Foley & Lardner LLP

(57) ABSTRACT

Devices and methods for determining timing offsets between wireless devices are provided. One method includes transmitting, from a first device, a request for timing data to first user equipment and receiving a response. The timing data is indicative of a frame timing associated with a reference time for both the first device and a second device. The method further includes determining a timing offset between the frame timing for the first device and a frame timing for the second device based on the timing data. Another method includes receiving a reference time from a timing reference device, applying a timestamp to frame timing data for the first device, receiving frame timing data from the second device time-stamped based on the reference time, and comparing the timing data to determine a time offset between the devices.

20 Claims, 8 Drawing Sheets

(51) Int. Cl.
  *H04W 88/06* (2009.01)
  *H04W 52/02* (2009.01)
  *H04W 84/04* (2009.01)
  *H04W 84/10* (2009.01)
  *H04W 76/28* (2018.01)

(52) U.S. Cl.
  CPC ........ *H04W 52/0209* (2013.01); *H04W 76/28* (2018.02); *H04W 84/042* (2013.01); *H04W 84/10* (2013.01); *H04W 88/06* (2013.01); *Y02D 70/00* (2018.01); *Y02D 70/1262* (2018.01); *Y02D 70/142* (2018.01); *Y02D 70/24* (2018.01); *Y02D 70/25* (2018.01)

(58) Field of Classification Search
  USPC ........................................................ 370/252
  See application file for complete search history.

(56) References Cited

U.S. PATENT DOCUMENTS

| | | | | |
|---|---|---|---|---|
| 2010/0054237 | A1* | 3/2010 | Han | H04J 3/0638 370/350 |
| 2011/0176483 | A1* | 7/2011 | Palanki | H04W 56/0015 370/328 |
| 2012/0218946 | A1* | 8/2012 | Ohshima | H04W 36/0083 370/328 |
| 2013/0083780 | A1* | 4/2013 | Luo | H04W 72/0406 370/336 |
| 2013/0150018 | A1 | 6/2013 | Su et al. | |
| 2013/0244653 | A1 | 9/2013 | Song et al. | |
| 2014/0064263 | A1* | 3/2014 | Cheng | H04W 8/005 370/350 |

FOREIGN PATENT DOCUMENTS

| | | |
|---|---|---|
| WO | WO-2010/135712 | 11/2010 |
| WO | WO-2012/146187 | 11/2012 |

OTHER PUBLICATIONS

3rd Generation Partnership Project, Technical Specification Group Radio Access Network; Physical Layer Procedures (FDD), V9.5.0 (Release 9), Mar. 2011, 99 pages.

Partial European Search Report for EP Application No. 15000273.1, dated Jul. 2, 2015, 6 pages.

* cited by examiner

TIME OFFSET ACQUISITION FOR DUAL CONNECTIVITY

CROSS-REFERENCE TO RELATED APPLICATIONS

The present application claims priority to and the benefit of Indian Provisional Patent Application No. 435/CHE/2014, titled "TIME OFFSET ACQUISITION FOR DUAL CONNECTIVITY," filed Jan. 31, 2014, which is incorporated herein by reference in its entirety.

FIELD

The present disclosure relates generally to the field of wireless communications.

BACKGROUND

In dual connectivity environments, a user equipment (UE) component may be simultaneously connected to two wireless base stations, such as Evolved Node B (eNB) devices in a Long Term Evolution (LTE) network. For example, a UE may be connected to both a macro cell eNB (e.g., an eNB configured to service a larger area) and a small cell eNB (e.g., an eNB configured to service a smaller area, such as a femtocell, microcell, picocell, etc.). The macro cell eNB and small cell eNB communicate with one another over a link with a non-ideal backhaul (e.g., high latency and/or low capacity), and are not time-synchronized. To accommodate for the non-ideal backhaul, the eNBs may run independent schedulers. Thus, it is challenging to determine any offset in frame timing between the two eNBs.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
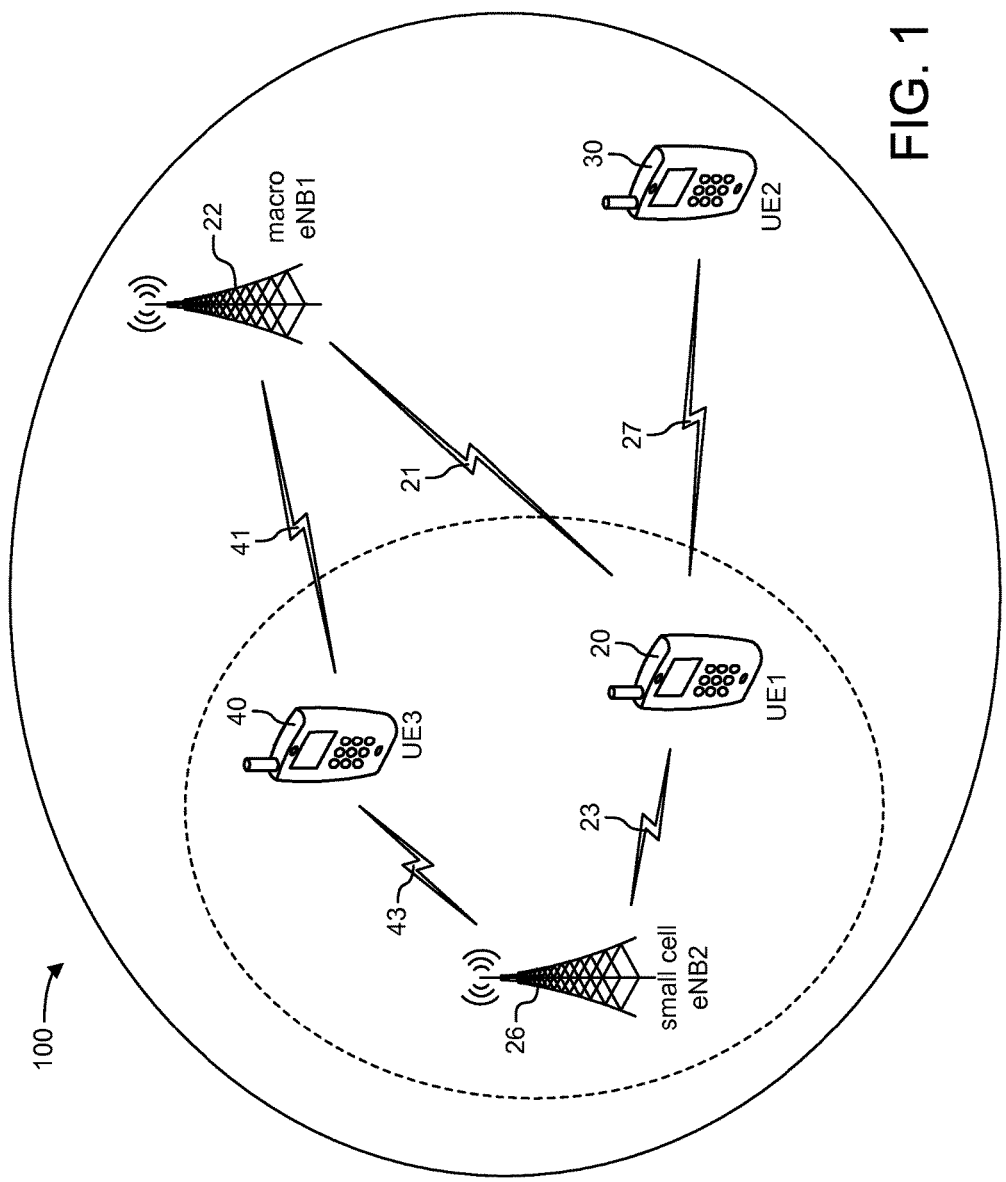
FIG. 1 is a diagram of a wireless networking environment including UEs connected simultaneously to two base stations according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for determining a timing offset between transmission frames and/or subframes for two or more base stations in a wireless networking environment are shown according to various exemplary embodiments. Coordination of discontinuous receive (DRX) parameters across two base stations (e.g., two eNBs) may be beneficial, from a UE power consumption perspective, as ON time and OFF time on the two eNBs can overlap. For coordinating DRX parameters, the two eNBs should be aware of offset in frame and subframe numbers between the eNBs. However, due to the non-ideal backhaul between the eNBs (e.g., which may not allow determination of timing offset over backhaul) and the fact that the two eNBs are not time synchronized, it is difficult to determine the timing offset between the eNBs.

The systems and methods of the present disclosure address this challenge by utilizing a reference source to correlate the timing between two or more eNBs and determine the timing offset between the eNBs. In some embodiments, the timing offset between the eNBs may be determined using a UE connected to both eNBs. A time offset request may be transmitted by one of the eNBs (e.g., a macro cell eNB) to the UE, and the UE may return timing offset data to the requesting eNB. The requesting eNB may determine the timing offset between the two eNBs based on the timing offset data, and may transmit the timing offset information to the other eNB (e.g., a small cell eNB). The eNBs then may use the timing offset to coordinate DRX parameters for UEs connected in a "dual connectivity" configuration in which the UEs communicate with both the eNBs, including UEs other than the UE that was used to determine the timing offset.

In some embodiments, the eNBs may utilize a global timing reference, such as a reference clock time received from a server device (e.g., a universal clock), to determine the timing offset between the eNBs. The eNBs may each obtain timing reference data from the global timing reference and may apply a timestamp to their frame timings with respect to the global timing reference. The time-stamped frame timing data for the first eNB may then be transmitted to the second eNB (and vice-versa, if desired), and the second eNB can determine the timing offset based on the timestamps in the frame timings for the two eNBs. The determined timing offset can again be used to coordinate DRX parameters for UEs connecting to both eNBs.

The embodiments disclosed herein may overcome a significant challenge in coordinating different time critical parameters between different base stations (e.g., macro eNBs and small cell eNBs). In some embodiments, the signaling overhead of the methods utilized herein may be small.

While the present disclosure discusses exemplary embodiments in relation to eNBs and coordination of DRX parameters in LTE networks, it should be appreciated that the methods disclosed herein may also be applicable to other types of base stations/network nodes, network parameters, and/or wireless networks. All such applications are contemplated by and fall within the scope of the present disclosure.

The concepts described herein may be incorporated into a future industry standard communication protocol (e.g., a 3GPP protocol), or may be implemented as an extension to an existing communication protocol. However, it should be understood that the present disclosure is not limited to a particular protocol. For example, the concepts disclosed herein may be applicable in environments involving dual connectivity with WiFi or environments involving multiple Radio Access Technologies (RATs).

Referring now to FIG. 1, a diagram of a wireless networking environment 100 including UEs connected simultaneously to two base stations is shown according to an exemplary embodiment. Environment 100 includes a macro eNB1 22 and a small cell eNB2 26. In some embodiments, macro eNB1 22 may be configured to communicate with user equipment in a larger geographic area than small cell eNB2 26. A UE1 20 is configured in a dual connectivity configuration in which it communicates through a first wireless link 21 with macro eNB1 22 and also communicates through a second wireless link 23 with small cell eNB2 26. In some embodiments, UE1 20 may be configured to communicate with one or more other devices, such as a UE2 30, through a direct device-to-device link 27. Environment 100 may also include other UEs connected to both eNB1 22 and eNB2 26, such as UE3 40, which is connected to eNB1 22 and eNB2 26 through wireless links 41 and 43, respectively.

Figure 2:
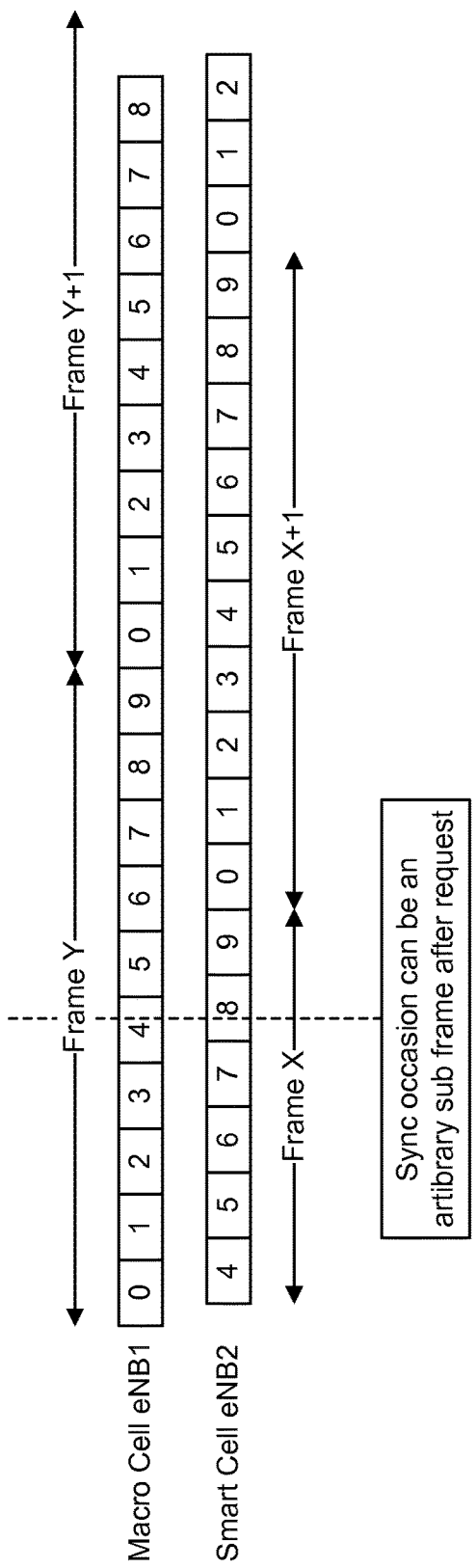
FIG. 2 is a frame/subframe timing diagram illustrating misalignment of frame and subframe numbers between two base stations according to an exemplary embodiment.

FIG. 2 is a frame/subframe timing diagram illustrating misalignment of frame and subframe numbers between two base stations according to an exemplary embodiment. FIG. 2 illustrates frame timing between macro eNB1 22 and small cell eNB2 26. In the illustrated example, each transmission frame of eNB1 22 and eNB2 26 includes nine subframes. The transmission frames in the illustrated example are out of synchronization with one another. For example, at the point in time associated with the vertical dashed line in FIG. 2, a first Frame Y of eNB1 22 is at a fourth subframe, which a first Frame X of eNB2 26 is already at an eighth subframe. Without determining the time offset between the frames, eNB1 22 and eNB2 26 cannot coordinate DRX parameters for UEs connected to the two eNBs.

Figure 3:
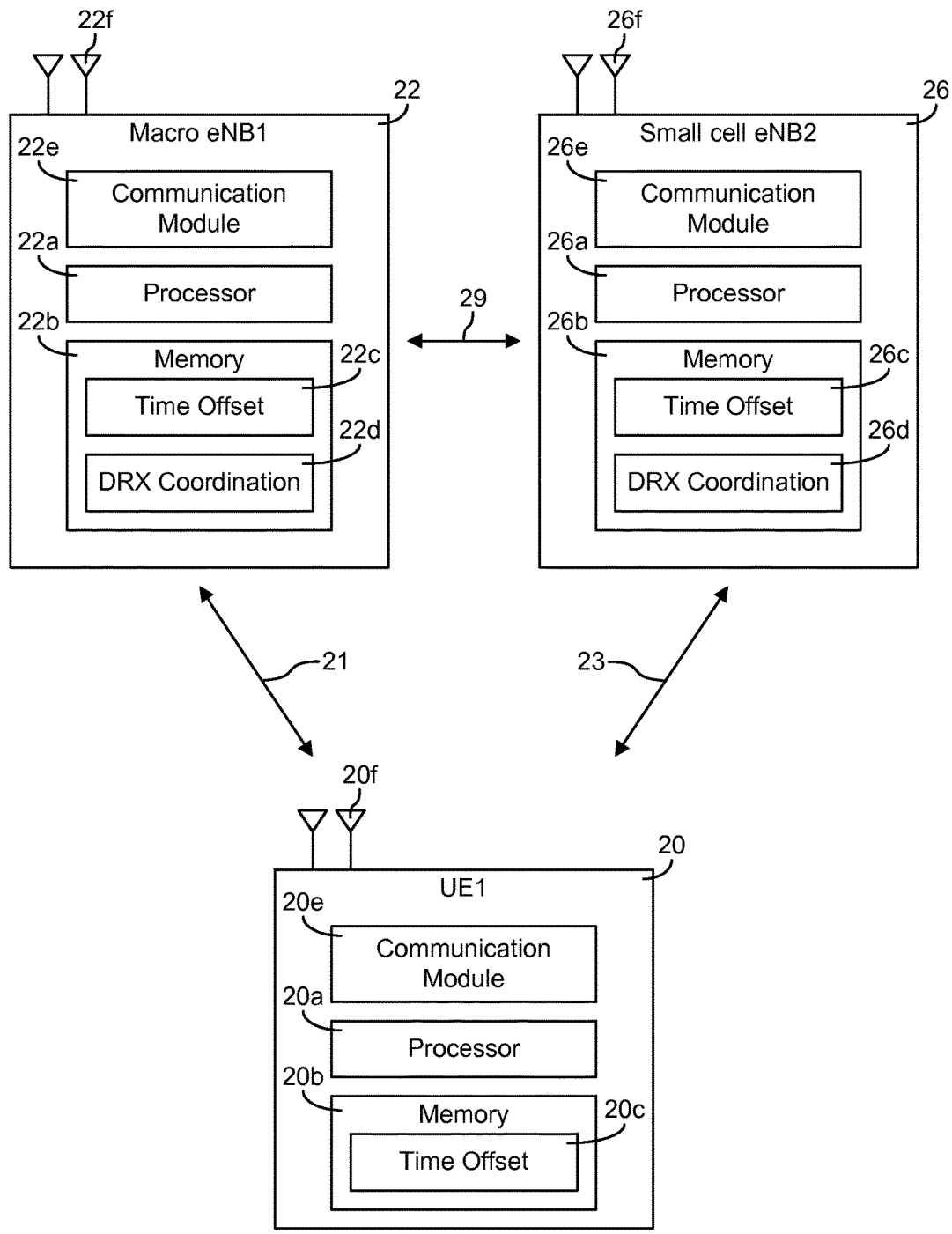
FIG. 3 is a block diagram of a system including two base stations and a UE in wireless communication with one another according to an exemplary embodiment.
Figure 4:
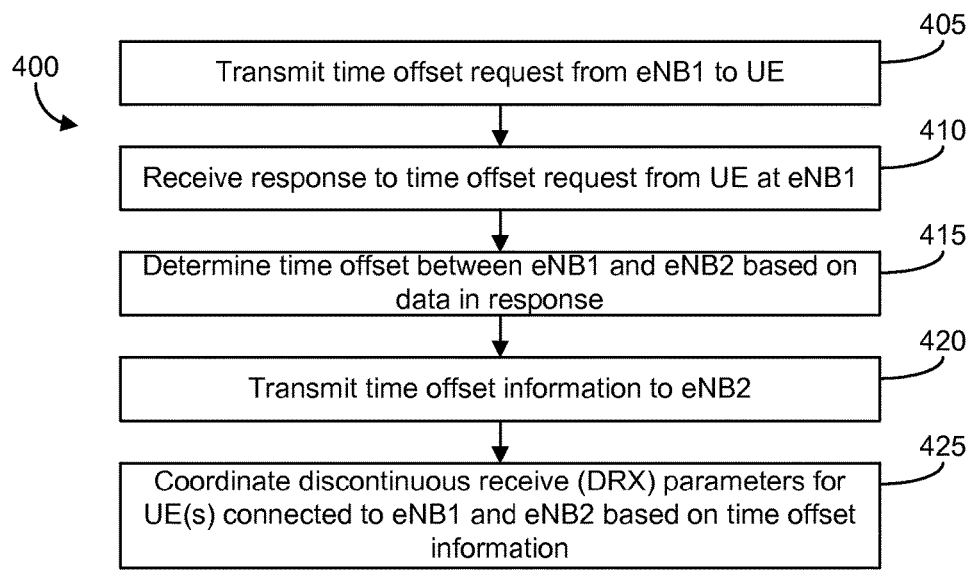
FIG. 4 is a flow diagram of a process for determining time offset information between two base stations according to an exemplary embodiment.

FIG. 3 illustrates a block diagram of a system including two base stations (eNB1 22 and eNB2 26) and a UE (UE1 20) in wireless communication with one another according to an exemplary embodiment. While FIG. 4 illustrates one exemplary implementation of eNB1 22, eNB2 26, and UE1 20, it should be appreciated that, in other implementations, these elements may include additional, fewer, or different components than are illustrated in FIG. 4 without departing from the scope of the present disclosure.

In the illustrated exemplary embodiment, macro eNB1 22 includes a processor 22a, a memory 22b, a communication module 22e, and one or more antennas 22f. Small cell eNB2 and UE1 20 include processors 26a and 20a, memories 26b and 20b, communication modules 26e and 20e, and antennas 26f and 20f, respectively. Processors 20a, 22a, and 26a may include any general purpose or special purpose processors. Memories 20b, 22b, and 26b may include any type of computer or machine-readable storage media (e.g., magnetic storage media, semiconductor-based storage media, optical storage media, etc.). Communication modules 20e, 22e, and 26e may include hardware and/or software configured to allow eNB1 22, eNB2 26, and UE1 20 to communicate with one another via wireless links 21, 23, and 29. Communications modules 20e, 22e, and 26e may be configured to transmit and receive wireless signals using antennas 20f, 22f, and 26f, respectively.

Memories 20b, 22b, and/or 26b may include one or more modules (e.g., computer or machine-executable instructions) configured to implement one or more functions of the eNBs and/or UE. At least one of the eNBs includes a time offset module configured to collect timing data and use the timing data to determine a timing offset between frames of eNB1 22 and eNB2 26. In some embodiments, eNB1 22 may include a time offset module 22c configured to transmit a request to UE1 20, in response to which UE1 20 may transmit a response including timing data. In some embodiments, the timing data may be indicative of frame position information for each of the eNBs at a particular reference time, as determined by UE1 20. In some embodiments, a time offset module 20c of UE1 20 may be configured to determine the time-correlated frame position information to be included in the request. Time offset module 22c may use the timing data from the UE1 20 response to determine a timing offset between frames/subframes of the two eNBs. In some embodiments, eNB2 26 may additionally or alternatively determine the timing offset between the eNBs (e.g., at some times and/or under some conditions). In some embodiments, one of eNB1 22 or eNB2 26 may not include a time offset module, and may rely on the other eNB to determine timing offsets between the two eNBs.

In some embodiments, both eNB1 22 and eNB2 26 may include time offset modules. For example, both eNB1 22 and eNB2 26 may be configured to receive a reference time from a global timing reference and use the reference time to timestamp their respective frame/subframe data. The frame/subframe data for at least one of the eNBs may be transmitted to the other, and the other eNB may use the time-stamped frame/subframe data to determine the timing offset between the two eNBs.

At least one of the eNBs may include a DRX coordination module (e.g., DRX coordination module 22d and/or 26d). DRX coordination modules 22d and 26d may be configured to use the determined timing offset information to coordinate DRX parameters for UEs connected to the same pair of eNBs. In some embodiments, the timing offset information may be used to coordinate DRX parameters for UEs other than UE1 20 (e.g., UE3 40, shown in FIG. 1) without requiring the same synchronization procedure to be repeated on the other UEs. In some embodiments, the timing information may be used to coordinate DRX parameters for an amount of time and/or number of transmission frames/cycles. The procedure may be repeated (e.g., periodically, after a predetermined number of transmission frames, etc.) to update the timing offset information and help ensure it is still accurate. In various embodiments, the DRX parameters coordinated using the timing information may include, for example, DRX offset parameters, DRX cycle information, and/or other parameters, such as those parameters, incorporated by reference herein, as shown in sections 10.3.6.34a "DTX-DRX information" and 10.3.6.34 "DTX-DRX timing information", in the 3GPP V9.6.0 Radio Resource Control (PAC) Protocol specification, and further explained in section 6C "Discontinuous transmission and reception procedures" in the 3GPP V9.5.0 Physical Layer Procedures (FDD) document.

Referring now to both FIGS. 1 and 4, a flow diagram of a process 400 for determining time offset information between two base stations is shown according to an exemplary embodiment. Under process 400, an eNB determines timing offset information for two or more eNBs by correlating the frame timing at a UE.

A time offset request may be transmitted from eNB1 22 to UE1 20 (405). In some embodiments, eNB2 26 may transmit the time offset request and determine the timing offset instead of or in addition to eNB1 22. In response to the request, UE1 20 may prepare timing data that cross-correlates the frame/subframe timings of eNB1 22 and eNB2 26 with respect to a particular reference time. For example, for a particular reference time, UE1 20 may determine a current frame/subframe number for each of eNB1 22 and eNB2 26. In the illustrative frame timings shown in FIG. 2, for example, for the reference time indicated by the dashed line, the timing data may indicate a frame reference for eNB1 22 of Frame Y, Subframe 4 and a frame reference for eNB2 26 of Frame X, Subframe 8. In some embodiments, the subframe boundaries may not be aligned, and UE1 may report the subframe having a greatest overlap.

eNB1 22 may receive the response, including the timing data, from UE1 20 (410). eNB1 22 may use the timing data to determine the timing offset between the frame timings of eNB1 22 and eNB2 26 (415). In some embodiments, eNB1 22 may be configured to compare the time-correlated frame timing data received from UE1 20 to determine the timing offset. For example, in the illustrative embodiment shown in FIG. 2, eNB1 22 may determine that eNB1 22 and eNB2 26 are out of synchronization by approximately four subframes. In some embodiments, UE1 20 may be configured to determine the timing offset and transmit the actual timing offset information to eNB1 22 within the request response. In some embodiments, eNB1 22 may be configured to transmit the determined timing offset information to eNB2 26 via link 29 (420). eNB1 22 and/or eNB2 26 may be configured to use the timing offset information to coordinate discontinuous receive (DRX) parameters for UEs connected to both eNB1 22 and eNB2 26 (425). In various embodiments, eNB1 22 is configured to coordinate one or more other types of parameters relating to power consumption and/or throughput of eNB1 22, eNB2 26, and/or connected UEs. In some embodiments, eNB1 22 is configured to coordinate one or more of measurement gaps, periodic channel quality indication (CQI) measurement, allocations to one or more UEs, etc.

Figure 5:
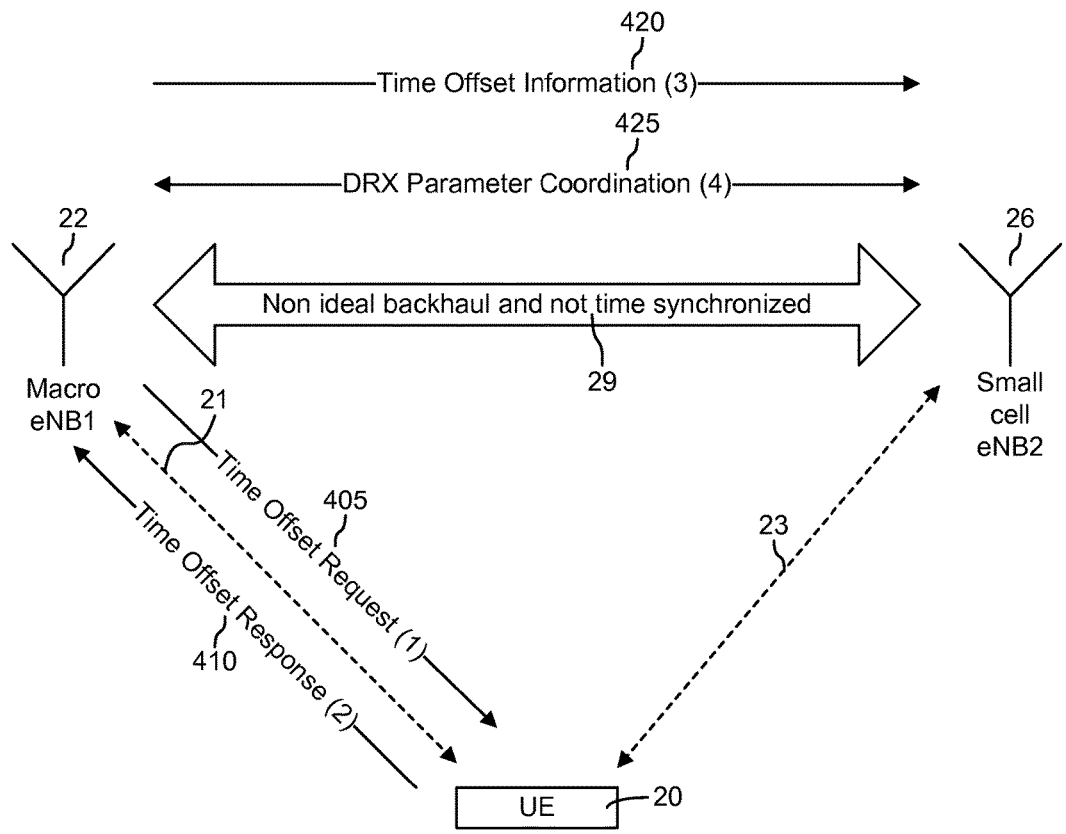
FIG. 5 is an illustration of signals that may be transmitted between the base stations and the UE under the process shown in FIG. 4 according to an exemplary embodiment.
Figure 6:
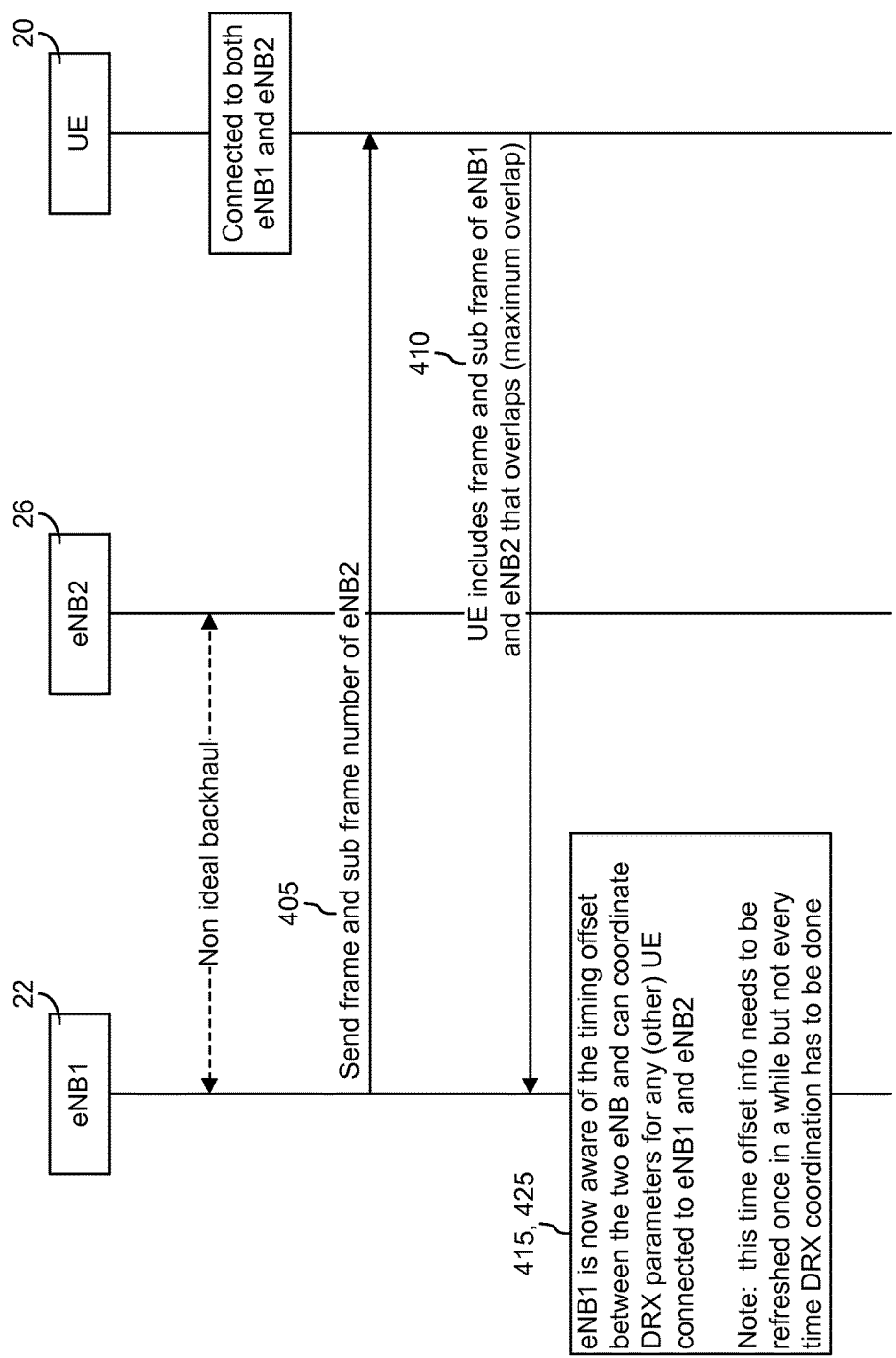
FIG. 6 is another illustration of signals that may be transmitted between the base stations and the UE under the process shown in FIG. 4 according to an exemplary embodiment.

FIGS. 5 and 6 provide visual illustrations of signals that may be transmitted between the base stations and the UE under the process shown in FIG. 4 according to exemplary embodiments.

Figure 7:
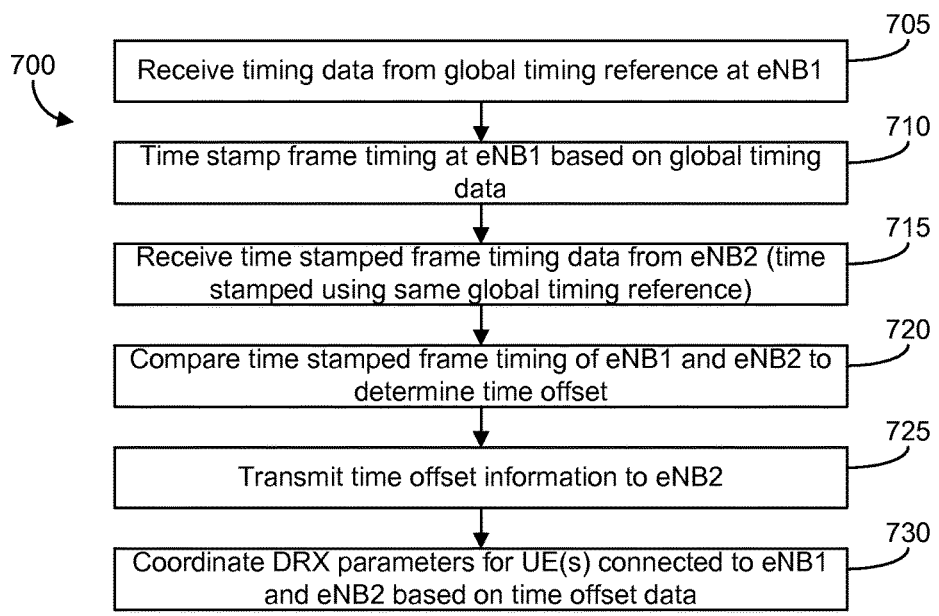
FIG. 7 is a flow diagram of a process for determining time offset information between two base stations using a global time source according to another exemplary embodiment.

In some embodiments, the eNBs may be configured to determine timing offset information without correlating frame timing through a UE. Referring now to FIGS. 1 and 7, a flow diagram of a process 700 for determining time offset information between two base stations using a global time source is shown according to another exemplary embodiment. eNB1 22 may receive a reference timing data from a global timing reference (e.g., a standard clock from a server device) (705). eNB1 22 may time stamp its frame timing data based on the received global timing data (710). eNB2 26 may also receive the timing reference and time stamp its frame timing data using the timing reference.

eNB1 22 may receive the time-stamped frame timing data from eNB2 26 (715) and compare the time-stamped frame timing data of eNB1 22 and eNB2 26 to determine a timing offset between the eNBs (720). In some embodiments, the timing offset may be determined in a similar manner as described above with reference to FIG. 4 (e.g., determining a frame/subframe associated with the reference time for each eNB and determining the timing offset based on the difference between the frames/subframes for the reference time). eNB1 22 may transmit the time offset information to eNB2 26 (725), and eNB1 22 and/or eNB2 26 may utilize the timing offset to coordinate DRX parameters for UEs connected to the pair of eNBs (730).

Figure 8:
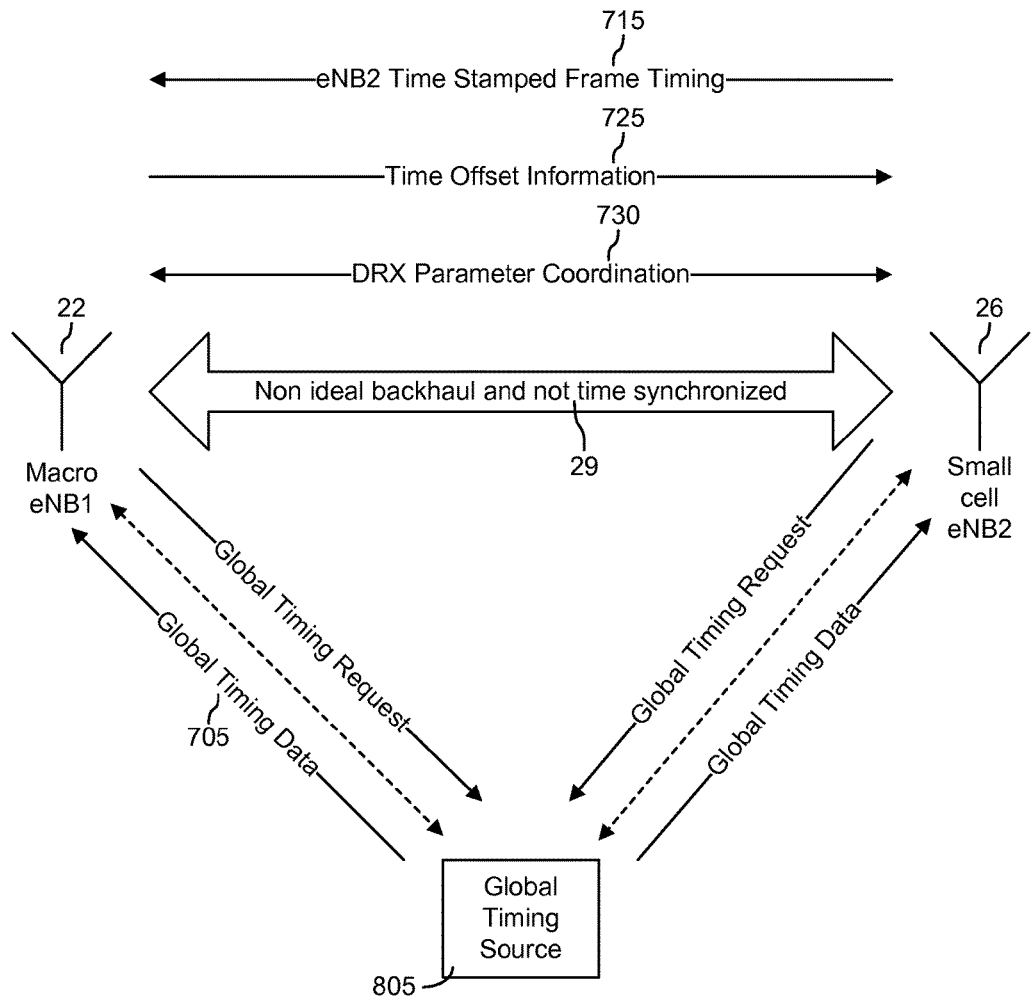
FIG. 8 is an illustration of signals that may be transmitted between the base stations and the global time source under the process shown in FIG. 7 according to an exemplary embodiment.

FIG. 8 is a visual illustration of signals that may be transmitted between the base stations and a global time source 805 under the process shown in FIG. 7 according to an exemplary embodiment.

According to an embodiment, a device includes a circuit configured to transmit a request for timing data to a first user equipment of the user equipment. The first user equipment is wirelessly connected to both the device and the second device. The instructions further cause the processor to receive a response including the timing data from the first user equipment. The timing data is indicative of a frame timing associated with a reference time for both the device and the second device. The instructions further cause the processor to determine a timing offset between the frame timing for the device and a frame timing for the second device based on the timing data received from the first user equipment. In some embodiments, the instructions are further configured to cause the processor to coordinate one or more parameters (e.g., discontinuous receive (DRX) parameters) for the first user equipment based on the timing offset.

According to another embodiment, a device includes a processor, a communication device configured to cause the device to wirelessly communicate with a second device and user equipment, and a memory. The memory has instructions stored thereon that, when executed by the processor, cause the processor to receive a reference time from a timing reference device and apply a timestamp to first frame timing data for the device based on the reference time. The instructions further cause the processor to receive second frame timing data for the second device. The second frame timing data has been time-stamped based on the reference time received by the second device from the timing reference device. The instructions further cause the processor to compare the first frame timing data and the second frame timing data to determine a timing offset between a frame timing for the device and a frame timing for the second device. In some embodiments, the instructions are further configured to cause the processor to coordinate one or more parameters (e.g., discontinuous receive (DRX) parameters) for the user equipment based on the timing offset, where the user equipment is connected to both the device and the second device.

In some embodiments, the circuit is, or includes, a processor. In some embodiments, the device includes a communication device configured to cause the device to wirelessly communicate with a second device and user equipment, and/or a memory having instructions stored thereon that, when executed by the processor, cause the processor to perform operations.

According to another embodiment, a method includes transmitting, from a first device, a request for timing data to a first user equipment, where the first user equipment is wirelessly connected to both the first device and a second device. The method further includes receiving, by the first device, a response including the timing data from the first user equipment. The timing data is indicative of a frame timing associated with a reference time for both the first device and the second device. The method further includes determining, by the first device, a timing offset between the frame timing for the first device and a frame timing for the second device based on the timing data received from the first user equipment. In some embodiments, the method further includes coordinating one or more parameters (e.g., discontinuous receive (DRX) parameters) for the first user equipment based on the timing offset.

According to another embodiment, a method includes receiving, by a first device, a reference time from a timing reference device and apply a timestamp to first frame timing data for the device based on the reference time. The method further includes receiving, by the first device, second frame timing data for the second device. The second frame timing data has been time-stamped based on the reference time received by the second device from the timing reference device. The method further includes comparing, by the first device, the first frame timing data and the second frame timing data to determine a timing offset between a frame timing for the device and a frame timing for the second device. In some embodiments, the method further includes coordinating one or more parameters (e.g., discontinuous receive (DRX) parameters) for the user equipment based on the timing offset, where the user equipment is connected to both the device and the second device.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable storage media for accomplishing its operations. The embodiments of the present disclosure may be implemented using an existing computer processor, or by a special purpose computer processor incorporated for this or another purpose. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

User equipment (UEs) that may be used in various embodiments of the present disclosure may include, but are not limited to, cellular telephones, data cards, USB dongles, personal/mobile devices having wireless communication capabilities (e.g., laptop/handheld/tablet computers, digital cameras, music devices, etc.), and Internet appliances.

Embodiments of the disclosure are described in the general context of method steps which may be implemented, in some embodiments, by a program product including machine-executable instructions, such as program code, for example, in the form of program modules executed by machines in networked environments. While the exemplary embodiments have been described above in the context of the LTE systems, it should be appreciated that the exemplary embodiments of this invention are not limited for use with only this one particular type of wireless communication system, and that they may be used to advantage in other wireless communication systems such as, for example, UTRAN, WCDMA, and others.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A first device comprising:
   a circuit configured to:
   transmit a request for timing data to a first user equipment, wherein the first user equipment is wirelessly connected to both the first device and a second device;
   receive a response including the timing data from the first user equipment, wherein the timing data is determined by the first user equipment, wherein the timing data is indicative of a first frame timing associated with a reference time for the first device and a second frame timing associated with the reference time for the second device, wherein the timing data is transmitted from the first user equipment to the first device; and
   determine a timing offset between the first frame timing for the first device and the second frame timing for the second device based on the first frame timing and the second frame timing received from the first user equipment.

2. The first device of claim 1, wherein the circuit is further configured to coordinate one or more parameters relating to at least one of a power consumption and a throughput of the first user equipment based on the timing offset.

3. The first device of claim 2, wherein the parameters comprise one or more discontinuous receive (DRX) parameters.

4. The first device of claim 1, wherein the circuit is further configured to coordinate one or more discontinuous receive (DRX) parameters for at least one additional user equipment other than the first user equipment based on the timing offset without re-determining the timing offset using the additional user equipment.

5. A first device comprising:
   a circuit configured to:
   transmit a request for timing data to a first user equipment, wherein the first user equipment is wirelessly connected to both the first device and a second device;

receive a response including the timing data from the first user equipment, wherein the timing data is determined by the first user equipment and indicative of a first frame timing associated with a reference time for the first device and a second frame timing associated with the reference time for the second device; and determine a timing offset between a frame timing for the first device and a frame timing for the second device based on the first frame timing and the second frame timing received from the first user equipment, wherein the first frame timing comprises a first frame number and a first subframe number determined by the first user equipment at the reference time for the first device and the second frame timing comprises a second frame number and a second subframe number determined by the first user equipment at the reference time for the second device, the circuit configured to receive the first frame number, the first subframe number, the second frame number, and the second subframe number from the first user equipment and determine the timing offset by comparing the first frame number and the first subframe number to the second frame number and the second subframe number.

6. The first device of claim 1, wherein the first device comprises a first Evolved Node B (eNB) device configured to communicate with the second device and the first user equipment over a Long Term Evolution (LTE) network, wherein the second device comprises a second eNB device.

7. The first device of claim 6, wherein one of the first device and the second device comprises a macro eNB device, and the other of the first device and the second device comprises a small cell eNB device, wherein the macro eNB device has a larger geographic area of coverage than the small cell eNB device.

8. A first device comprising:
a circuit configured to:
receive a reference time from a timing reference device, wherein the reference time is transmitted from the timing reference device to both the first device and a second device;
apply a timestamp to first frame timing data for the first device based on the reference time;
receive second frame timing data for the second device, wherein the second frame timing data is transmitted from the second device to the first device, wherein the second frame timing data has been time-stamped based on the reference time received by the second device from the timing reference device; and
compare the first frame timing data and the second frame timing data to determine a timing offset between a first frame timing for the first device and a second frame timing for the second device.

9. The first device of claim 8, wherein the circuit is further configured to coordinate one or more parameters relating to at least one of a power consumption and a throughput of a user equipment based on the timing offset, wherein the user equipment is connected to both the first device and the second device.

10. The first device of claim 9, wherein the parameters comprise one or more discontinuous receive (DRX) parameters.

11. The first device of claim 8, wherein the first frame timing data and the second frame timing data comprise a frame number and a subframe number associated with the reference time for the first device and the second device, respectively.

12. The first device of claim 9, wherein the first device comprises a first Evolved Node B (eNB) device configured to communicate with the second device and the user equipment over a Long Term Evolution (LTE) network, wherein the second device comprises a second eNB device.

13. The first device of claim 12, wherein one of the first device and the second device comprises a macro eNB device, and the other of the first device and the second device comprises a small cell eNB device, wherein the macro eNB device has a larger geographic area of coverage than the small cell eNB device.

14. A method comprising:
transmitting, from a first device, a request for timing data to a first user equipment, wherein the first user equipment is wirelessly connected to both the first device and a second device;
receiving, by the first device, a response including the timing data from the first user equipment, wherein the timing data is determined by the first user equipment, wherein the timing data is indicative of a first frame timing associated with a reference time for the first device and a second frame timing associated with the reference time for the second device; and
determining, by the first device, a timing offset between the first frame timing for the first device and the second frame timing for the second device based on the first frame timing and the second frame timing received from the first user equipment.

15. The method of claim 14, further comprising coordinating one or more parameters relating to at least one of a power consumption and a throughput of the first user equipment based on the timing offset.

16. The method of claim 15, wherein the parameters comprise one or more discontinuous receive (DRX) parameters.

17. The method of claim 14, further comprising coordinating one or more discontinuous receive (DRX) parameters for at least one additional user equipment other than the first user equipment based on the timing offset without re-determining the timing offset using the additional user equipment.

18. A method comprising:
transmitting, from a first device, a request for timing data to a first user equipment, wherein the first user equipment is wirelessly connected to both the first device and a second device;
receiving, by the first device, a response including the timing data from the first user equipment, wherein the timing data is determined by the first user equipment and indicative of a first frame timing associated with a reference time for the first device and a second frame timing associated with the reference time for the second device; and
determining, by the first device, a timing offset between a frame timing for the first device and a frame timing for the second device based on the first frame timing and the second frame timing received from the first user equipment, wherein the first frame timing comprises a first frame number and a first subframe number determined by the first user equipment at the reference time for the first device and the second frame timing comprises a second frame number and a second subframe number determined by the first user equipment at the reference time for the second device, the timing offset determined by comparing the first frame number and the first subframe number to the second frame number and the second subframe number.

19. The method of claim 14, wherein the first device comprises a first Evolved Node B (eNB) device configured to communicate with the second device and the first user equipment over a Long Term Evolution (LTE) network, wherein the second device comprises a second eNB device.

20. The method of claim 19, wherein one of the first device and the second device comprises a macro eNB device, and the other of the first device and the second device comprises a small cell eNB device, wherein the macro eNB device has a larger geographic area of coverage than the small cell eNB device.

* * * * *